July 17, 1928.
C. L. MABEY
1,677,789
BATTERY BOX CLAMP
Filed Aug. 6, 1927
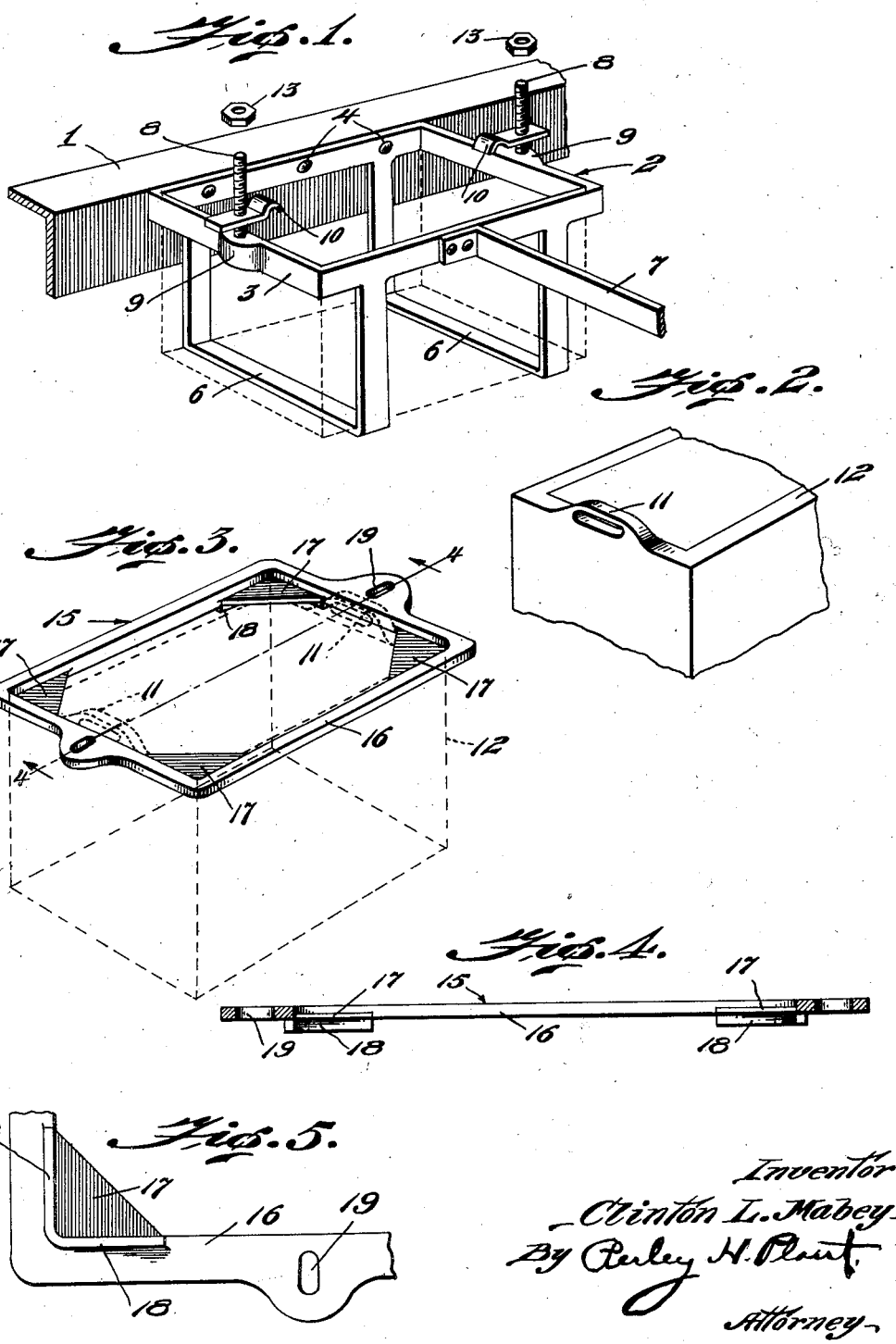

Patented July 17, 1928.

1,677,789

UNITED STATES PATENT OFFICE.

CLINTON L. MABEY, OF PROVIDENCE, RHODE ISLAND.

BATTERY-BOX CLAMP.

Application filed August 6, 1927. Serial No. 211,105.

This invention relates to an improved battery box clamp adapted to engage the top of a battery box at spaced points, thereby exerting a substantially uniform pressure thereagainst at widely separated points whereby a more uniform and firm holding means is provided than by the structures heretofore employed for the purpose.

One object of the invention is to provide a device of this character which is of simple construction and which is adapted to retain a battery box against movement in two directions at right angles to each other, and capable of application to the forms of battery box holders now in common use.

Another object of the invention is to provide a simple and efficient device of the character described which is of inexpensive construction and capable of being readily applied to battery box holders now in use.

Further objects and advantages of the invention relate to various improved details of construction and novel methods of operation as will be more fully set forth in the detailed description to follow.

Referring to the accompanying drawings wherein is illustrated one embodiment of the invention:—

Fig. 1 is a perspective view of one form of battery box holder, showing the same in its normal application to the frame of an automobile, and illustrating the form of clamping means now in general use for holding the battery box.

Fig. 2 is a perspective view of a portion of a battery box of the type in common use.

Fig. 3 is a perspective view of the improved clamp, illustrating its position with reference to a battery box, which is shown in dotted lines.

Fig. 4 is a longitudinal sectional view of the clamp, taken along the line 4—4 of Fig. 3, and, Fig. 5 is a fragmentary plan view of the underside of the clamp showing the position of one of the holding plates and the depending lug.

In the drawings, 1 designates a portion of the frame of an automobile to which is secured a holder 2 of skeleton construction, being formed in the present instance with a horizontal band 3 which may be secured to the frame 1 in any desired manner, such as by bolts or rivets 4, and which is provided with transverse supporting strips 6 for supporting a battery box. A metal strip 7 may connect the battery box holder to another part of the automobile frame if desired in order to provide a more firm and rigid support therefor. Threaded posts 8 extend upwardly from bosses 9 carried by the horizontal band 3, and 10 are the usual clamping devices now in use for engaging the handles 11 of a battery box 12 to hold it in place, the nuts 13 being adapted to be threaded upon the posts 8 to force the clamping devices 10 into close engagement with the handles 11.

The clamping devices 10 as now in use are open to the following objections. Since they engage the battery box at only two points and have no extended bearing thereon, the box tends to work loose and the clamping devices to move upward on the posts due to the constant movement of the battery box as the various jars and strains incident to road travel are communicated to the holder. Moreover, these clamping devices fail to hold the battery box against lateral movement in the holder, and as they engage the handles only, they tend to pull the box apart longitudinally, thus causing leakage of the fluid and eventual destruction of the battery box. The movement of the battery box in the holder also tends to increase the corrosion of the terminals.

The improved battery box clamp, which is indicated generally by the numeral 15, is, in the embodiment illustrated herewith, of skeleton construction and comprises a substantially rectangular frame portion 16 extending about or overlying the upper face of a battery box 12, and is provided at the corner thereof with plates 17, which in the present instance are formed integral with the frame 16, and the frame has downwardly extending lugs 18 adapted to engage the side and end portions of the battery box to hold the same against horizontal movement. The rectangular frame 16 is provided at opposite ends with slightly oblong openings 19 for the reception of the posts 8, and nuts 13 may be threaded down against the upper face of the rectangular frame to press the frame firmly into contact with the upper face of the battery box. The form of the frame and the arrangement of the plates 17 is such as to provide a plurality of bearings engaging the upper face of the battery box to hold the same against vertical movement, and the arrangement of the lugs 18 is such as to hold the battery box against horizontal movement either laterally or in an endwise direction in the holder. While the holder 2 is shown herewith as being of skeleton construction it may be made with closed bottom, side and end portions if desired. The clamp 15 comprising the plates 17 and lugs 18 is formed, as shown herewith, from an integral casting, but may be made by stamping or cutting the shape from a metal plate if desired. The form and arrangement of the bearing plates 17 and lugs 18 may be varied widely without departing from the spirit and scope of my invention, and, it is obvious that these parts may be made separate from and secured to the border frame 16 instead of being formed integral therewith, although, for efficiency in operation as well as for lowering the costs of production, I prefer to make these parts integral with the border frame.

While the bearing plates 17 and lugs 18 are shown as located at the corners of the border frame, they may be arranged in other positions thereon, provided that they furnish a plurality of spaced bearing surfaces or extended bearing surfaces adequate to afford substantially uniform contact with the upper surface of the battery box and such contact with the side and end portions thereof as will hold the battery box against substantial vertical or horizontal movement in the holder 2. The central portion of the border frame 16 is preferably open to permit the battery box handles 11 to project therethrough and give access to the terminals, but the same may be formed with two or more smaller openings for the handles and to permit access to the terminals instead of the single large opening shown, if such change is found desirable.

While I have shown and described my improved clamp as being of rectangular form, since it is illustrated in connection with a battery box having a rectangular upper face, the clamp may be made of such shape as is necessary to conform to the contour of the upper face of the battery box and effect contact therewith at a plurality of points.

What I claim is:—

1. A battery box clamp comprising a rectangular open frame shaped to conform to the contour of the battery box and provided with diagonal corner plates adapted to bear against the upper edges of the battery box at spaced points thereon and having downwardly extending lugs engaging the outer side of the battery box adjacent to the upper edges thereof.

2. In a battery box clamp, a skeleton frame comprising a substantially rectangular border portion having plates located at spaced points on said border portion and engaging the upper face of the battery box, and lugs depending from the border portion of said frame and engaging the outer sides of the battery box to prevent horizontal movement of said battery box relative to the frame.

3. In a device of the character described, a battery box holder, a battery box in said holder, and a clamp therefor comprising a skeleton frame provided with corner plates adapted to bear against the upper edges of the battery box adjacent to the corners thereof, and having depending lugs engaging the sides of said battery box adjacent to the corners thereof whereby lateral movement of said battery box in said holder is prevented, and means carried by said holder for drawing the clamp into close engagement with said battery box.

In testimony whereof I have affixed my signature.

CLINTON L. MABEY.